April 14, 1964 J. W. I. HEIJNIS 3,128,612
SHAFT COUPLING
Filed Nov. 16, 1961
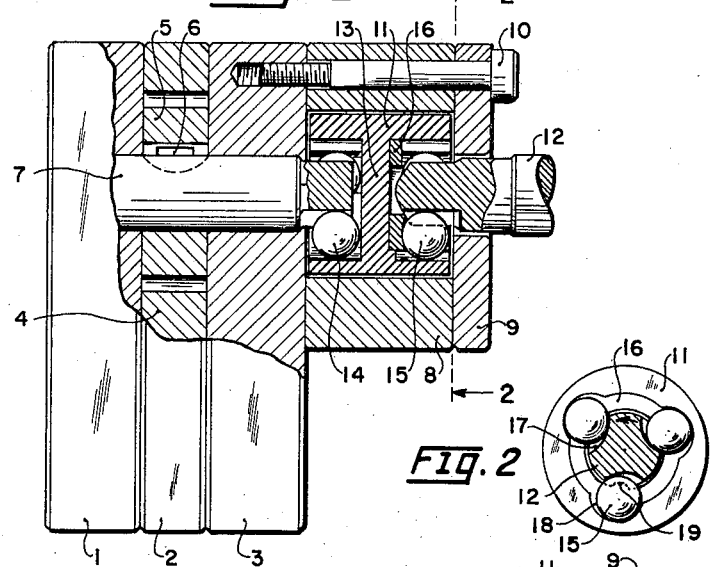
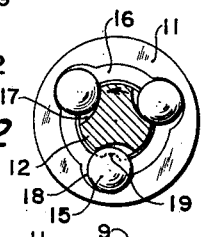
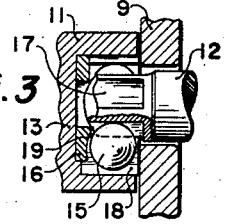
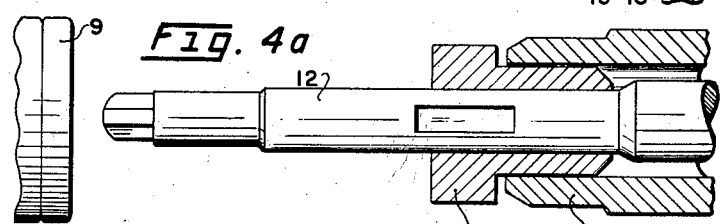
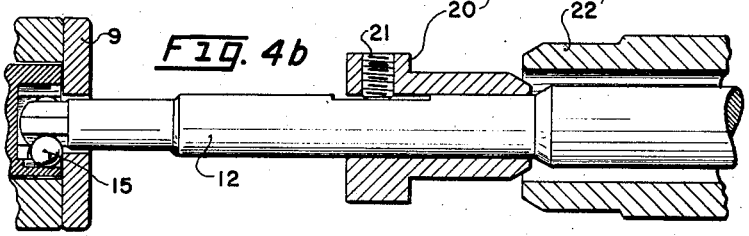
INVENTOR.
JAMES WATT IJSBRAND HEIJNIS
BY
*Francis W. Young*
ATTORNEY 2,993,230
United States Patent Office 3,128,612
Patented Apr. 14, 1964

3,128,612
SHAFT COUPLING
James W. I. Heijnis, Arnhem, Netherlands, assignor to American Enka Corporation, Enka, N.C., a corporation of Delaware
Filed Nov. 16, 1961, Ser. No. 152,881
Claims priority, application Netherlands Dec. 3, 1960
3 Claims. (Cl. 64—6)

This invention relates generally to a shaft coupling for pumps used in the melt spinning of synthetic yarns and more particularly to a positive type universal joint coupling which operates effectively despite slight misalignment of the shafts being coupled.

Shaft couplings for connecting a driving shaft to the pump shaft of a gear wheel pump very often consist only of a cylindrical member having non-circular or groove-shaped internal recesses in which mating surfaces of the shaft ends fit loosely. See, for example, U.S. Patent No. 2,993,230, owned in common with this application. Since such a coupling very often serves also to prevent liquid being pumped from escaping along the pump shaft, the end surfaces of the cylindrical section are enclosed between flat sealing plates.

A disadvantage to said known construction arises if the axes of the pump shaft and the driving shaft are even slightly mis-aligned, in which case the coupling member tends to tilt and transmit a transverse force and/or bending moment onto the pump shaft. This phenomenon causes irregular operation of the pump and a high degree of wear, for instance, of the coupling member, the sealing plates, the pump shaft or even the gear wheels. Wear on any of these parts in turn leads to a particularly irregular pump output and a relatively large waste of the liquid being fed, especially if the pump is used to force synthetic polymer through a melt spinning machine.

It is very difficult to obtain perfect alignment of the driving shaft and the pump shaft because of the great difference in temperature prevailing within the apparatus. On the other hand, the leakage of liquid from the apparatus gives rise to the local formation of adhering solidified deposits and/or highly undesirable chemical decomposition products. When spinning a polyamide melt, for example, a rim of carbonized polymer is formed at the seal, leading to additional wear.

Shaft couplings provided with balls generally are known. They are characterized by rows of balls aligned in the direction of a driving shaft and fitted within cooperating recesses provided both in one of the connecting shaft ends and in a coupling box surrounding the recessed shaft end. This type of coupling permits an axial displacement between the shaft ends but does not accommodate an angle variation or mis-alignment between the shafts to be coupled.

With a different type of known shaft coupling, two series (each comprising a relatively large number) of balls are arranged circularly both in recesses provided in the two shaft ends and in corresponding recesses provided in a coupling box surrounding the shaft ends. While it is true that this type of shaft coupling permits slight mis-alignment, the operating angle deviation between shafts is much smaller than that generally encountered in apparatus used for melt spinning synthetic yarns. Moreover, it has been found that the relatively large number of balls gives rise to a complicated construction which may easily be damaged. Additionally, this type of coupling has not been known heretofore for driving a gear wheel pump.

An object of the present invention is to provide a shaft coupling not having the disadvantages enumerated above. Another object of this invention is to provide a positive type, yet flexible, coupling having a minimum of component parts but which is capable of transmitting force between considerably mis-aligned driving and driven shafts.

Still another object of the present invention is to provide a ball and recess type flexible shaft coupling which is self-tightening to compensate for any lost motion required in transmitting force through mis-aligned shafts and which provides an effective seal against loss of liquid being pumped by use of the coupling.

The foregoing objects may be accomplished, in accordance with the present invention, by providing three longitudinal and peripheral recesses in the operating end of the shafts to be coupled, by providing a tubular coupler or coupling box having internal recesses at each end which cooperate with the shaft recesses, and by inserting a single ball in each mating pair of recesses. The recesses of course must be arc-shaped in cross section at suitable dimensions to receive the balls. Preferably, the shaft recesses are formed at a slight angle, such as 5°, from the shaft axis, leading or lagging the direction of shaft rotation, to produce a wedge effect for providing both a wear-compensating and positive coupling, as well as sufficient axial or thrust pressure to effectuate sealing against loss of liquid being pumped by use of the coupling.

It has been found that in this way a simple coupling system is obtained which permits considerable mis-alignment of the shafts without the expected occurrence of friction or wear between parts of the pump and the coupling. That a total of no more than three balls surprisingly allows a much greater angle deviation than does a larger number of balls arranged circularly in a flat plane must probably be attributed to the fact that the circularly arranged series of only three balls may be kept in truly geometrical contact with an imaginary circular cylinder passing obliquely through this circle of balls, since three points not in a straight line define a plane.

Conversely, if the circle comprises more than three balls, a cylinder which passes angularly through this circle can, theoretically, contact only three of these balls. If the cylinder is moved such that its axis describes a conical plane, then there will always be a combination of three different balls that are in contact with the cylinder. This accounts for the unsuitable erratic rotation of mis-aligned shafts coupled in the known manner with more than three balls.

Additionally, it has been found that with a shaft coupling according to the present invention, in which the end surfaces of the coupling box are enclosed between flat sealing plates so that the box may function as a sealing member, the box does not tend to tilt even if the driving shaft makes a rather considerable angle of deviation from the driven shaft. Consequently, the transmission of rotary motion from the coupling box to the pump shaft might be considered ideal since use is made of the usual construction in which the coupling box is provided with a recess having fitted therein a correspondingly shaped pump shaft end. It has been found, however, that the clearance between the wall of the slot and the end of the pump shaft may produce irregular motion of the coupling box. This irregularity is communicated as rotary motion of the pump shaft, as a result of which the pump output has definite minimum and maximum values. In order to prevent this, the coupling box must be centered very accurately relative to the pump shaft. The present invention obviates these difficulties.

The transmission of force by the balls between the shaft ends and the coupling box is more stable if the point of contact between each ball and the corresponding recess in the shaft ends are diametrically opposed. It has been found that this position is achieved automatically if the arc radius of the recesses in the coupling box is smaller than the arc radius of the recesses in the shaft ends, and if the radius of the balls is smaller than the radii of curvature of the recesses. To fit between the coupling box and the shaft ends, the ball diameter of course must be equal to or smaller than the maximum width, measured in a radial direction, between the recesses in the shaft ends and in the box if said members are arranged coaxially. Contact between the balls and the recesses will vary with the diameter of the balls. A smaller ball diameter will produce a greater surface pressure and a greater angle of deviation of the connected shafts will be possible.

It has been found that a most satisfactory transmission of force, combined with the most reasonable surface pressure on the balls, may be obtained with a simple and sufficiently flexible shaft coupling construction if the radii of curvature of all the recesses are equal and if the maximum slot width between the recesses in the shaft ends and the box, with these parts being arranged coaxial, is approximately equal to the sum of the radius of a ball and the radius of curvature of a recess. If these proportions are observed, the diameter of the balls may be varied within considerably wide limits. Upon use of a relatively large diameter ball, the surface pressure decreases with constant shaft load. On the other hand, the shaft ends in which the recesses for the balls are provided is weakened. According to the invention, the most favorable value found is a diameter of the balls which approximates two-thirds that of the shaft ends.

Shaft couplings used with spinning pumps for melt spinning machines are generally so constructed that the driving shaft may be withdrawn and consequently disengaged from the pump. With the shaft couplings described, however, there is a danger that the balls will drop out of the recesses in the coupling box. For this reason, preference is given to an embodiment utilizing retaining cams inside the coupling box for maintaining the three balls in position when the driving shaft is withdrawn.

The liquid-sealing function of the coupling is obtained by causing the end surfaces thereof to mate against or cooperate with the flat sealing plates between which it is enclosed. The liquid to be pumped through causes pressure against the end of the coupling box facing the pump shaft, as a result of which the coupling box presses against one of the sealing plates in an outwardly direction. It has been found, according to the invention, that even if the pressure of the liquid against the shaft end should be extremely low, an excellent sealing effect can nevertheless be obtained if at one or at both ends of the box, and in the corresponding shaft ends, the recesses run along helices which are arranged at an angle of less than 5° with the shaft.

As a result of the action of force not being directed to the shaft in a plane truly perpendicular thereof, the coupling box is forced or screwed against one of the sealing plates. In this connection, several variants are conceivable. For instance, only the recesses in the pump shaft may be arranged obliquely, or only the recesses in the driving shaft. Also, all the recesses of course may be arranged at the aforesaid angle. The recesses may further be so arranged that the coupling box is pushed in the direction of the pump or in the opposite direction. In other words, the angle may either lead or lag shaft rotation.

Preferably, the balls should fit in the recesses in such a manner that they have a tolerance, in an axial direction, which is less than 5% of the ball diameter. This allowance adapts the balls to a considerable angle of deviation, although the tolerance, on the other hand, is so small that the balls are substantially always positioned in a plane perpendicular to the coupling box axis.

It has been remarked previously that if this shaft coupling is used with spinning pumps for melt spinning machines, often the driving shaft must be withdrawn from the coupling box. This is realized, for instance, by providing the driving shaft with a telescopic sliding member. Such a member permits disengagement of the shaft end from the coupling box, after which the shaft end may be swung out of the way by incorporating in the shaft a knee or hinge joint. These arrangements permit rapid discontinuation of the spinning pump operation, or simple dismantling of the pump.

In this connection, it is important that the structure permit quick re-coupling of the driving shaft to the pump. For that purpose, a very suitable embodiment of the shaft coupling consists in a hub carried by the driving shaft outside the coupling box which, upon withdrawal of the driving shaft, fits slidably in a bushing displaced in an axial direction relative thereto. When the shaft is in its coupled position, the hub is clear of the bushing, but the moment the driving shaft loses contact with the balls the hub slides into the bushing by which it is centered.

Other objects and advantages will become apparent upon study of the following detailed disclosure taken in conjunction with the accompanying drawings, wherein FIGURE 1 is an elevational view, partly in section, illustrating a gear wheel pump having attached thereto the shaft coupling of this invention;

FIGURE 2 is an end elevational view on an enlarged scale of the coupling box taken along lines 2—2 of FIGURE 1;

FIGURE 3 is a side sectional view of the FIGURE 2 detail;

FIGURE 4(a) shows the driving shaft in uncoupled position; and

FIGURE 4(b) shows the driving shaft in coupled position.

With attention now directed to FIGURE 1, the plane parallel plates 1, 2 and 3 form the casing of a spinning pump of the gear wheel type. This type pump is generally used for feeding a polymer melt under pressure to a melt-spinning apparatus (not shown). The plates 1, 2 and 3 are held together by bolts and the entire pump unit is attached to a spinning machine, also by means of bolts (not shown).

Inside the intermediate plate 2 is a freely rotatable gear wheel 4 which cooperates with a driving gear wheel 5. The latter may be secured to pump shaft 7 for rotation therewith by the key 6. A cylindrical ring 8 and an annular disk 9 are attached and sealed to the plate 3 by means of three bolts 10. The coupling box 11, which serves to couple the pump shaft 7 to the driving shaft 12, is supported for rotation inside ring 8. With the exception of the partition 13, the coupling box 11 is provided on both sides with bores which extend inwardly from the end surfaces.

The pump shaft 7 and the coupling box 11 are intercoupled by the three balls indicated at 14, whereas the box 11 and the driving shaft 12 are coupled by three balls 15. A washer 16 provided with retaining cams 19 serves to lock the balls 15 against the disk 9 when the driving shaft is withdrawn from the coupling box 11. The coupling box 11 fits between the plate 3 and the disk 9, leaving a very small clearance, so that only a small axially directed pressure against the box is required to prevent escape of liquid from the system. The cylindrical ring 8 has been omitted from FIGURES 2 and 3 for purposes of clarity.

These figures show that the operating end of driving shaft 12 is provided with three recesses 17. They also show that the inner wall of the box 11 is provided with three recesses 18 in each of which lies a ball 15. The shaft 12 rotates in the direction indicated by the arrow. The cams 19 on the washer 16, together with the disk 9, enclose the balls 15 but permit some play in an axial direction on the order of approximately 4% of the diameter of the balls.

FIGURES 4(a) and 4(b) show the driving shaft in uncoupled and in coupled condition, respectively. Secured to this shaft is a hub 20 which may be longitudinally adjusted by means of a set screw 21. The outer surface of hub 20 fits in the bushings 22, leaving a small clearance. When the driving shaft is withdrawn from the box 11, the hub slides into the bushing 22; consequently, the driving shaft 12 remains at all times centered relative to the shaft coupling. While the angular arrangement of recesses 17, 18 relative to the shaft axis has not been specifically shown, it will be apparent from FIGURE 4(a) that the same could easily be constructed obliquely, or slightly helical, to provide the thrust necessary for sealing purposes and to absorb any lost motion due to the tolerance required for correcting mis-alignment of shafts such as 7 and 12.

Inasmuch as many other embodiments and details will become apparent to those skilled in this art, it is intended that the scope of the present invention be limited only to the extent set forth in the following claims.

What is claimed is:

1. Apparatus for connecting the end of a driving shaft to the end of an adjacent driven shaft extending generally in the same direction as said driving shaft comprising a tubular coupling box surrounding each of said shaft ends, means defining a partition within said coupling box between said shaft ends, means defining no more than three longitudinal arcuate recesses in the internal surface of said coupling box on each side of said partition, means defining no more than three longitudinal arcuate recesses in the outer surfaces of said driving shaft and said driven shaft, one for cooperating with each of said coupling box recesses, a spherical ball positioned between each cooperating pair of recesses for connecting said coupling box to said driving shaft and said driven shaft despite any misalignment which might exist between shaft ends, and means defining an enclosure around said shaft ends and coupling box.

2. Apparatus as set forth in claim 1 wherein the longitudinal axis of said shaft recesses extend obliquely to the shaft axis by no more than about 5° whereby thrust is provided for sealing said coupling box with said enclosing means, thus preventing liquid leakage past the shaft ends.

3. Apparatus as set forth in claim 1 wherein the longitudinal axis of said coupling box recesses extend obliquely to the box axis by no more than about 5° whereby thrust is provided for sealing said coupling box with said enclosing means, thus preventing liquid leakage past the shaft ends.

References Cited in the file of this patent

UNITED STATES PATENTS

| | | |
|---|---|---|
| 1,103,716 | Wallbillich | July 14, 1914 |
| 1,966,528 | Stegeman et al. | July 17, 1934 |
| 1,972,779 | Kradoska | Sept. 4, 1934 |
| 2,309,939 | Dodge | Feb. 2, 1943 |
| 2,897,660 | Croset | Aug. 4, 1959 |